Figure 4:
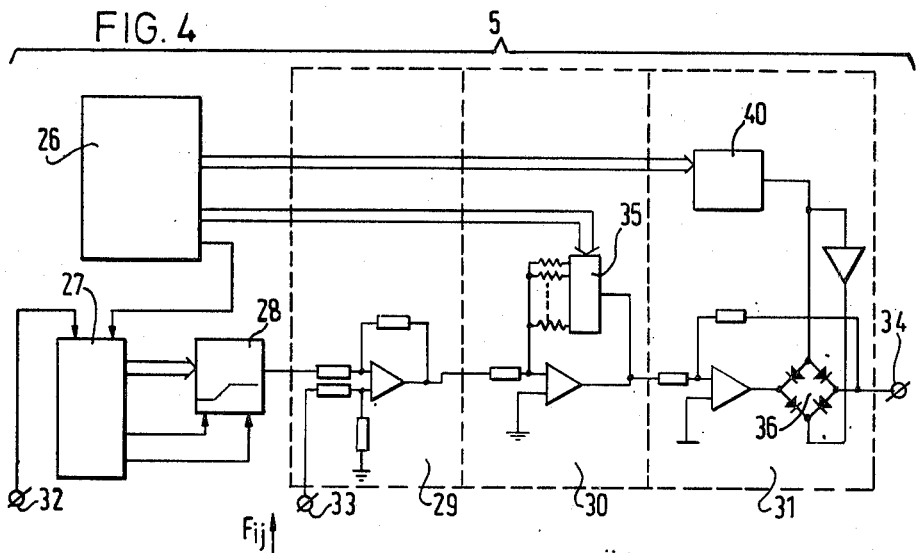

United States Patent [19]

Van Brussel et al.

[11] 4,445,273

[45] May 1, 1984

[54] DISPLACEMENT CONTROL DEVICE

[75] Inventors: Hendrik M. Van Brussel; Joseph A. G. Simons, both of Leuven, Belgium

[73] Assignee: Leuven Research and Development V.Z.W., Leuven, Belgium

[21] Appl. No.: 325,835

[22] Filed: Nov. 30, 1981

Related U.S. Application Data

[63] Continuation of Ser. No. 128,586, Mar. 10, 1980, abandoned.

[30] Foreign Application Priority Data

Mar. 12, 1979 [NL] Netherlands .......................... 7901956

[51] Int. Cl.³ ................................................ B23Q 7/00
[52] U.S. Cl. ....................................... 29/714; 414/730
[58] Field of Search ...................... 29/714, 709; 414/730

[56] References Cited

U.S. PATENT DOCUMENTS

| | | | |
|---|---|---|---|
| 3,824,674 | 7/1974 | Inoyama et al. | 29/714 X |
| 3,965,562 | 6/1976 | Inoyama | 29/714 X |
| 3,984,006 | 10/1976 | Takeyasu et al. | 414/730 X |
| 4,041,294 | 8/1977 | Inoyama et al. | 29/709 X |

OTHER PUBLICATIONS

IBM Technical Disclosure Bulletin, vol. 16, No. 6, Nov. 1973, pp. 2037-2040.

*Primary Examiner*—Jimmy C. Peters
*Attorney, Agent, or Firm*—Diller, Ramik & Wight

[57] ABSTRACT

A device for causing a first object to perform a given, desired displacement determined by a second, fixedly arranged object that is to say, a translation and/or a rotation, particularly intended for assembling objects in industrial production processes, said device comprising a positioning means for moving the first object into a desired position with respect to the second object, comprising an auxiliary body designed for carrying the first object and journalled in a manner such that it has a plurality of degrees of freedom in displacement, driving means for each degree of freedom, a force measuring member for each degree of freedom for measuring the counter-force exerted on the first object during the displacement according to the degree of freedom concerned, feedback means between each force measuring member and the corresponding driving means, wherein the functional relationship between the displacement of the auxiliary body in accordance with a degree of freedom and the relevant counter-force is adjustable during operation.

1 Claim, 10 Drawing Figures

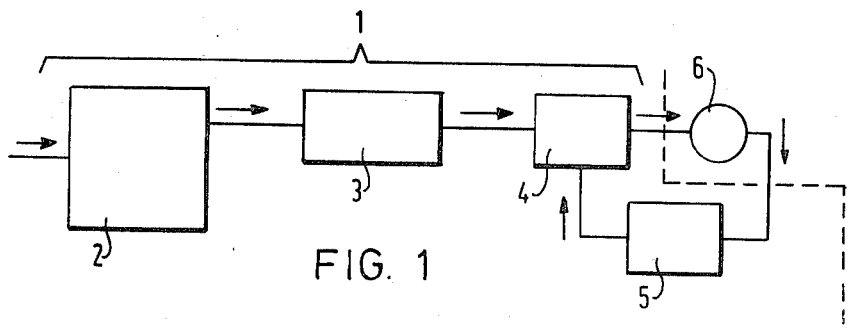
FIG. 1
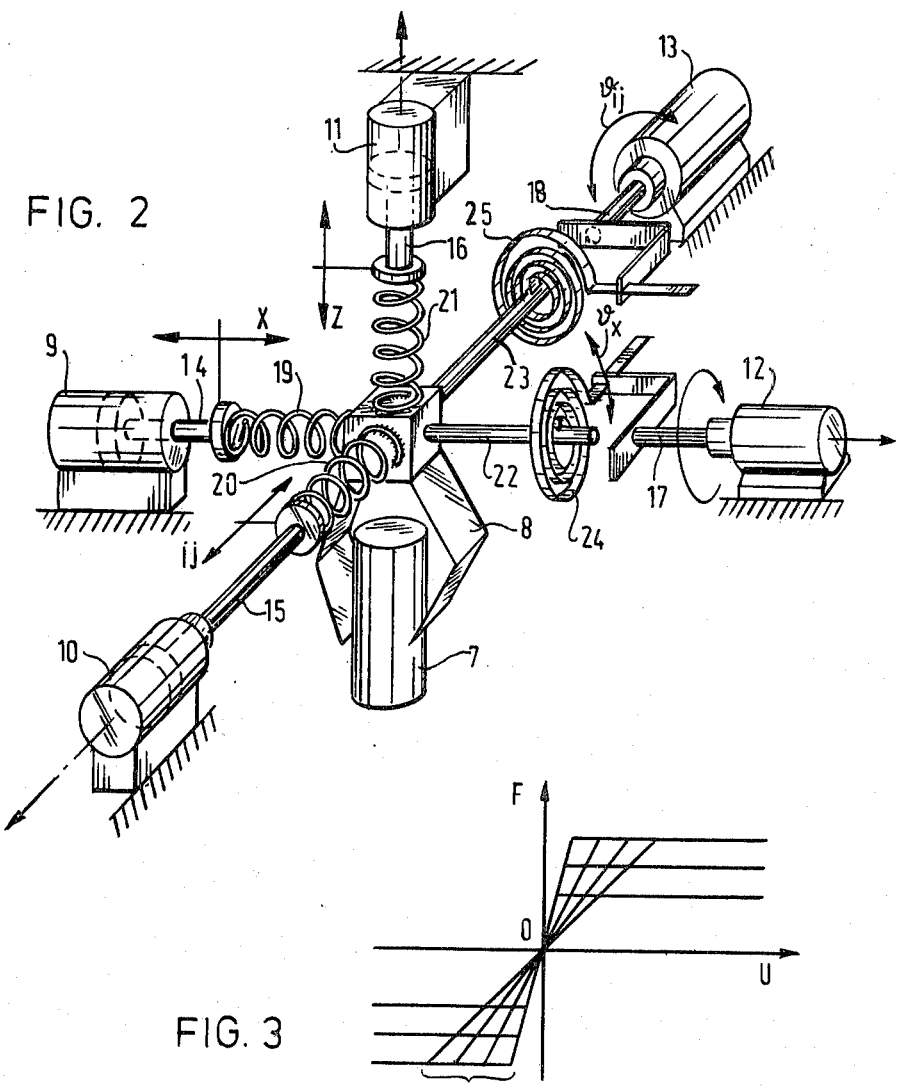
FIG. 2
FIG. 3

DISPLACEMENT CONTROL DEVICE

This application is a continuation, of application Ser. No. 128,586, filed Mar. 10, 1980 now abandoned.

The invention relates to a device for causing a first object to perform a desired displacement determined by a fixedly positioned second object, that is to say, a translation or a rotation, particularly intended for assembling objects in industrial production processes, said device comprising positioning means for moving the first object into a desired position with respect to the second object.

For assembling objects, particularly with the aid of pin-and-hole connections in industrial mass production processes various methods and devices are employed.

In a conventional, still frequently employed method the worker manually manipulates the pin and corrects the displacements of the pin in accordance with visual information and the counterforces experienced until the pin has shifted over the desired, axial distance into the hole. In the case of very narrow fits and sharp edges the visual information may be insufficient for ensuring a reliable insertion of the pin into the hole without damage.

In the case of very intimate fit it furthermore often occurs that the pin gets stuck askew in the hole. In literature this phenomenon is often termed "jamming."

In an alternative technique a machine is used, which has a fixed time for the operation concerned and a fixed displacement stroke set once for all. Each operational station is specifically designed for carrying out one manipulation, for example, the insertion of the pin into the hole, the displacement of the pin over the desired, axial distance, the fixation of the pin, the check of the connection and so on. With this machine neither displacement nor force detection is used for checking or controlling the process. As a consequence, the said phenomenon of jamming of the parts to be assembled repeatedly occurs. This may even occur with machines operating with extreme accuracy, since the dimensions of the parts may slightly vary for each specimen. Therefore, in practice the assembling machine may be out of operation up to 35% of the process time. Since the machine is specifically intended for a single purpose and designed for this purpose, it is relatively expensive and its setting can be modified only with difficulty which precludes a desirable flexibility of the production process, for example, with respect to the introduction of design variations for the products.

The invention has for its object to provide a device of the kind set forth in the preamble by which the actual displacement can be brought into accurate agreement with the desired displacement.

A further object of the invention is to provide a device of the type described in the preamble which permits of the device, to carry out the above-mentioned operations without external modifications irrespective of the shape, dimensions and the tolerances of the parts to be assembled.

Furthermore the invention has for its object to provide a device of the kind set forth in which the force produced between the two objects cannot exceed a given maximum value.

A further object of the invention is to provide a device of the type described in which the jamming of the objects can be avoided.

In order to achieve the aforesaid purposes the device according to the invention is characterized by an auxiliary body designed for carrying the first object, which body is journalled so that it has a plurality of degrees of freedom of displacement, by driving means for each degree of freedom, by a force measuring member of each degree of freedom for measuring the counter-force exerted on the first object upon displacement in accordance with said degree of freedom, by feedback means between each force measuring member and the corresponding driving means, while the functional relationship between the displacement of the auxiliary body in accordance with the degree of freedom and the related counter-force during operation is adjustable.

Further features and particularities of the device in accordance with the invention will be described more fully with reference to a drawing which shows in FIG. 1 a functional block diagram of an industrial robot with a first embodiment of the device in accordance with the invention for explaining the principle of the invention, FIG. 2 partly a schematic, perspective view and partly a symbolic equivalent reproduction of a second embodiment of the invention having five degrees of freedom i.e. three for translation and two for rotation, an equivalent compliance being provided for each degree of freedom, FIG. 3 a graph of a plurality of potential, adjustable functional relationships between the displacement of the auxiliary body in accordance with a degree of freedom and the related counter-force, FIG. 4 a basic diagram of the control-unit forming part of the embodiment shown in FIG. 1, FIG. 5 a schematic bidimensional representation of the shape of a pin-hole connection and the play of forces involved, FIG. 6 a bidimensional force space showing a plurality of force levels by way of illustration of the invention, FIG. 7 a graph of the forces in accordance with the five degrees of freedom as a function of time measured in a practical case to form a pin-hole connection by the device shown in FIG. 2, FIG. 8 a schematic, axial sectional view of two objects to be coupled by means of a pin-hole connection during the phase of approach, FIG. 9 an elevational view corresponding with the view of FIG. 8 at a later instant and FIG. 10 an elevational view corresponding to the sectional views of FIGS. 8 and 9 at a still later instant.

An industrial robot designated as a whole in FIG. 1 by reference numeral 1, comprise a control-computer 2, an arm or manipulator 3 coupled herewith, a wrist-joint 4 coupled with the manipulator 3 and a control-unit 5 coupled with the wrist-joint 4. The direction of the information signals exchanged between the various parts is indicated by arrows. In the functional diagram of FIG. 1 "the process" is symbolically represented as a unit 6 coupled on the one hand with the wrist-joint 4 and with the control-unit 5 on the other. The term "the process" is to be understood to mean, for example, the insertion of a pin into a hole. The wrist-joint 4 comprises a force measuring member (not shown).

From the drastically simplified block diagram of FIG. 1 it will be apparent that the process 6 is included in a feedback system. The control-unit 5 connected as a feedback element is capable of influencing the driving force and the displacements in accordance with the forces occurring in the process, so that a dynamic process control is obtained. The properties, particularly, of the control-unit 5 will be described in detail hereinafter.

FIG. 2 shows an automatically operating, self-correcting robot in accordance with the invention.

A first object or pin 7 is rigidly clamped in an auxiliary body or claw 8 shown schematically. This claw 8 is journalled with the aid of known means (not shown) in a manner such that it has five degrees of freedom i.e. a translation in the directions indicated by x, y, and z and a rotation around the x and the y directions, as indicated in FIG. 2.

For each degree of freedom the claw 8 can be driven by a motor i.e. by the motors 9, 10, 11, 12, and 13 respectively. The motors 9, 10, 11 act upon the claw 8 through the translation driving shafts 14, 15 and 16 respectively. The motors 12, 13 act upon the claw 8 through the rotation driving shafts 17 and 18 respectively.

Between the free ends of the shafts 14,15,16 and the corresponding faces of application of the claw 8 three compliances 19, 20, 21 respectively are shown symbolically as helical springs, through which the respective translation forces of the motors 9,10, 11 are transferred to the claw 8.

The rotation forces of the motors 12,13 are transferred to the claw 8 through two rotary shafts 22,23 connected with the claw 8 in the x and y directions and through two torsion compliances symbolically represented by spiral springs 24 and 25 respectively.

In FIG. 2 the cross-hatched parts represent symbolically the connection of the motors 9 to 13 with carrying frames (not shown). Needless to say that for ensuring completely independent displacements in accordance with the various degrees of freedom the carrying frames have to be displaceable in orthogonal directions.

Hereinbelow will be explained the necessity of providing for each degree of freedom a compliance between the driving motor concerned and the claw.

By long exercise a man can develop an extraordinary skill in accurate assembling owing to the sensitivity and the flexibility of the human wrist and hand (2/degrees of freedom). It particularly appears that the compliance owing to slip between an engaged object and the fingers as well as the elasticity of the skin and the subjacent tissue are of determinative significance in assembling.

From a simplified, theoretical model it appears that the addition of a robot arm having six degrees of freedom to a force pick-up for each degree of freedom provides sufficient information and flexibility in manipulating in order to solve a typical assembling problem.

In practice, however, it appears that such an automatic device is not capable of performing to an extent comparable to human performances.

The mechanically rigid structure of the conventional robot, which is necessary for obtaining a suitable, dynamic response, brings about great problems in processing force information. From a detailed analysis of the play of forces occurring in establishing a pin-hole connection it appears that, if no compliance is present in a loop of force, extremely complicated corrective movements with co-ordination between various degrees of freedom are necessary. Therefore, a self-explanatory complication is the very complex character of the calculations to be carried out on line by the computer. Moreover, unsolvable situations may occur, such as the aforesaid jamming during the insertion of a pin into a hole. A known servo-system in which the servo-loop balances out the driving forces and the counter-forces is not capable of solving such a situation, since there is no unequivocal relation between the measured force and the character of the relative positioning error.

The necessity of complex calculations and the unsolvability of ambiguous situations can be avoided by including suitable compliances in the wrist-joint.

The usability of passive compliances is limited by their intrinsic lack of flexibility. They have to be chosen with regard to a given treatment and their value often depends for the same treatment upon the dimensions of the objects to be assembled.

The limitations of passive compliances can be obviated by rendering the compliances controllable.

In the device according to the invention the advantages of passive and active accommodations are combined.

FIG. 3 is a graph of the functional relationship between the displacement u of the auxiliary body and the corresponding counter-force F.

The general terms "displacement" and "force" include for the rotational degrees of freedom also the "angular turn" and the "moment" respectively.

The compliance C is generally defined as being the quotient of the deflection and the force i.e. in FIG. 3, $\mu/F$, the cotangent of the angle between the line of connection between a point of the graph and the origin O and the positive u-axis.

From the graph of FIG. 3 is appears that the compliance in the linear spring region or the extent of displacement resulting from the exertion of a force is adjustable in a plurality of steps, in the embodiment shown three steps. These three steps correspond to three straight parts of the graph going through the origin being at different angles to the positive v-axis.

It furthermore appears from the graph that the force production level or else the maximum value of the driving force generating the counter-force is adjustable preferably in 16 steps, in the example shown, however, only three steps. These steps correspond to three horizontal parts of the graph on both sides of the origin O.

It will be appreciated, then, that the springs 19, 20, 21, 24 and 25 symbolically represent fixed compliance values corresponding to only one set of possible values which may be imposed on the system by the control mechanism of this invention. Thus, it will be further appreciated that the springs 19, 20, 21, 24 and 25 are not physically present but are merely symbols of the principle employed. In practice, the driving motor 9 functions like a spring 19 except that instead of a fixed compliance as would be the case for the spring 19, the compliance is adjustable. Thus, in a situation for example in which misalignment of the pin 7 causes the claw 8 to shift along the X axis when the parts 7 and 39 come into contact the displacement $v_x$ so caused will be resisted by a counterforce $F_x$ exerted by the motor 9, the compliance $v_x/F_x$ being adjustable and established by the control system of this invention. On the other hand, it should be remembered that since the magnitude of the counterforce $F_x$ is a function of the displacement $v_x$, the effect at any instant is the same as if a spring 19 is present whose compliance $v_x/F_x$ is the same as the compliance to which the motor 9 is adjusted at that instant.

It will be appreciated that ambiguity can initially exist in the system by virtue of the fact that the counterforce ($F_x$ in this case) resists the displacement $v_x$ whereas, in fact, for correcting the misalignment counterforce may be required in the opposite direction. However, as is shown in FIG. 7, the system of this invention is capable of rapidly resolving such ambiguities. Referring to FIG. 7, it will be seen that until the time $t_1$ when the parts have engaged (e.g., see FIG. 10), none of the counterforces are of significant magnitude. However, as soon as the parts have engaged, the counterforce $F_z$ rapidly increases until, at time $t_2$, it exceeds the threshold $L_Z$ and the command signal a is produced for the duration of the time during which $F_z$ exceeds $L_Z$. In FIG. 7, at the same time $t_1$, the counterforce $F_x$ rapidly increases which indicates that the engagement of the parts and the increasing counterforce $F_z$ is causing the claw 8 to shift along the x axis. However, the magnitude of the counterforce $F_x$ rapidly increased to an upper limit $L_X$ at time $t_3$ which, with $F_z$ still exceeding its limit $L_Z$, causes the system to reverse the direction of $F_x$ as shown. As soon as the direction is reversed at $t_4$, $F_z$ begins to decrease as indicated at b and at time $t_5$ it becomes less than $L_Z$ at which time the control signal a ceases. Thereafter, every time the counterforce $F_z$ reaches the limit $L_Z$, a control signal d, e, f-m is generated which causes the counterforce $F_x$ to increase toward the limit $L'_X$ as indicated at p, q, r-u, each such adjustment of the counterforce $F_x$ reducing the counterforce $F_z$ from the limit $L_Z$, as shown. In other words, the pin 7 progressively enters the hole in the workpiece 39.

Figure 7:
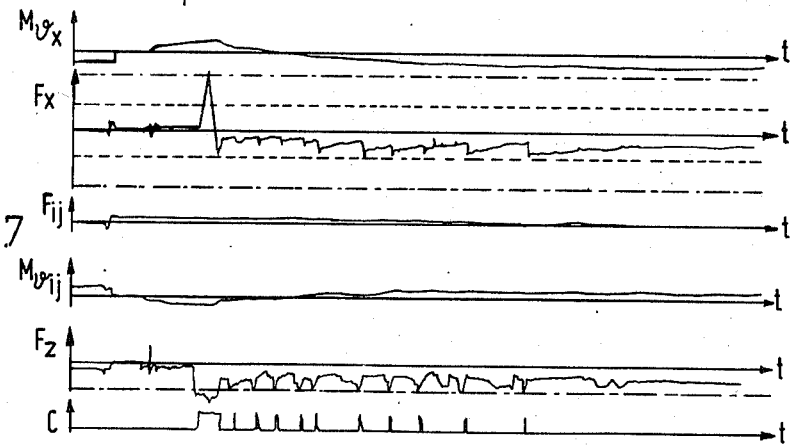

It should be remembered that the compliance $v/F$ for all counterforces is adjustable so that, in FIG. 7, the displacement associated with each counterforce is not illustrated. Generally speaking, the compliances which are used initially will depend upon the particular assembly problem being addressed. For example, for the assembly process of FIGS. 8-10, the compliance values for the moments $M_x$ and $M_y$ are initially set high, i.e., a relatively large angular displacement is resisted by a relatively small counterforce. In this way, the pin 7 can readily "cock" about both the x and y axes when the parts engage (FIG. 10). On the other hand, the compliance values for the lateral forces $F_x$ and $F_y$ are initially set at lower values, i.e., relatively small displacements $v_x$ or $v_y$ are resisted by relatively large counterforces $F_x$ and $F_y$.

Figure 8:
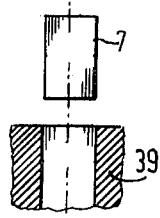

As will be evident from FIG. 8, the assembly process is such that the pin 7 is initially very nearly aligned with the hole in the workpiece 39. For such a condition, there would be very little lateral displacement in the x or y directions when the parts are engaged and, also, there would be very little tendency for angular displacements about these axes. Thus, as shown in FIG. 9, the pin 7 is deliberately misaligned by tilting it about one or both of the x and y axes. In this way, when the parts do engage (FIG. 10) significant lateral displacement is assured. FIG. 7 indicates the case where the deliberate misalignment resulted in a situation where the parts, when engaged, caused substantial counterforce $F_x$ but little, if any, other counterforce response due to the engagement of parts. It will be understood that other and different counterforce response could have been present. However, in each case the control technique remains the same, that is, the counterforce response or responses are assessed for transgression of the set limits (see FIGS. 5 and 6) to determine whether a modification of the compliance should be effected (lower limit exceeded) or whether a reversal in direction of the counterforce is required (maximum limit exceeded).

FIG. 4 shows a basic diagram, partly in the form of blocks, of a control-unit 5 as shown in FIG. 1, by which during the process the corrective forces and displacements required in accordance with the invention are controlled for the claw 8. The construction of the circuit arrangement as such does not form part of the invention and will, therefore, not be discussed in detail. However, various modifications in the relative disposition of the various units, while maintaining the functional properties of the control-unit 5, are lying within the scope of those skilled in the art.

As far as necessary, the direction of the information signals is again indicated by arrows.

The control-unit 5 shown comprises a computer 26, an error buffer 27, a digital/analogue converter 28, a PID circuit 29, a controllable amplification control-circuit 30, a controllable circuit 31 for controlling the saturation level, a connecting terminal 32 for receiving the output signal of a position measuring member, a connecting terminal 33 for receiving the output signal of a tachometer and an output terminal 34 for the application of the output signal of the control-unit 5 to the driving motor concerned. The circuit 30 comprises a multiplexing circuit 35. The circuit 31 includes a digital/analogue converter 40 and a diode bridge 36. As further active elements operational amplifiers (not shown) are provided.

The control unit 5 is capable of performing the compliance variations described with reference to FIG. 5 and furthermore of controlling process-governing steps to be described hereinafter.

Figure 5:
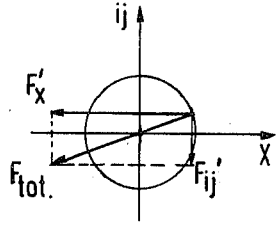

FIG. 5 shows schematically a potential situation in the establishment of a pin-hole connection and of the forces involved.

Due to an axial deflection the wall of the hole and the pin have in common two contact points, at least two small contact surfaces, which corresponds in the case of given driving forces in accordance with the various degrees of freedom to the force $F_{total}$ having a component $F'_x$ in the x-direction and a component $F'_y$ in the y-direction. The forces $F'_x$ and $F'_y$ correspond to the counter-forces in accordance with the degrees of freedom x and y respectively.

The adjustability during operation of the functional relationship between the displacement of the auxiliary body in one of the degrees of freedom and the corresponding counter-force is employed during the assembling of objects in order to obtain an unequivocal relation between the measured force and the relative positioning error. In dependence on the stage of the assembling process said functional relationship is adjusted such that, upon a transgression in one or more of the degrees of freedom by the counter-forces of adjusted force values, the exertion of a counter-force in one or more of the degrees of freedom causes an elimination of the force pattern concerned or a change of forces, that delivers an unequivocal answer about the character of the relative positioning error and about the displacement force concerned to be exerted.

Figure 6:
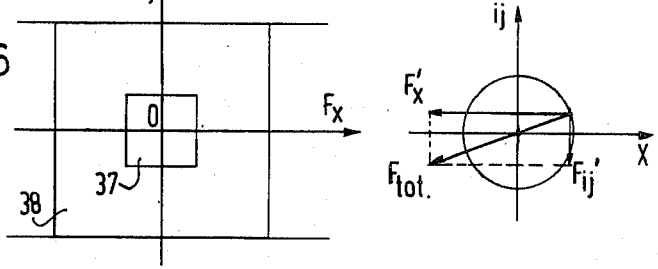

FIG. 6 illustrates an orthogonal force space in which the abscissa corresponds to the force $F_x$ in the x-direction and the ordinate to the force $F_y$ in the y-direction. Consequently the forces $F'_x$ and $F'_y$ of FIG. 5 are the forces $F_x$ and $F_y$ corresponding to one specific case.

In order to illustrate the last-mentioned feature of the invention, the force space of FIG. 6 shows two force zones i.e. a first, square zone 37 symmetrical around the original O and a second zone 38 symmetrical ground the origin in a square outer circumference, said second zone joining the first zone round about. The circumferential lines of the zones 37 and 38 correspond each to a given, adjusted maximum force. From the square circumferential shape of the zones it is evident that the same values are adjusted for the x- and the y-directions. In view of the symmetry of the situation illustrated in FIG. 5 this is a logical choice. For other situations other levels may be adjusted, which may be different for different degrees of freedom.

It is advantageous for the magnitude of the force at which the direction of the displacement reverses to be adjustable. A variation of one or more force levels brings about a corresponding shift of two parallel, corresponding circumferential lines of FIG. 6, which is equivalent to a change-over of one set of horizontal, relatively parallel graph parts of FIG. 3 to a different set.

In the manner described it can be ensured that ambiguous situations are more readily solved, while the occurrence of unsolvable situations such as the "jamming" phenomenon described above is excluded.

The device according to the invention permits of carrying out mass production assembly, in which an excellent uniformity of the products is attended by a short time of manufacture. Moreover, the risk of waste of faulty products and of non-productive periods of the robot are minimized.

FIG. 7 shows as a function of time on the same time scale one below the other the moment $M_x$ for rotation about the x-axis, the force $F_x$ in the x-direction, the force $F_y$ in the y-direction, the moment $M_y$ for rotation around the y-axis, the force $F_z$ in the z-direction and the displacement commands c. The figure relates to a device having five degrees of freedom as shown in FIG. 2. A detailed analysis of the course of the relationship between the various forces will not be described. Some particularities are discussed below.

From the course of $F_z$ it is apparent that some time after the initiation caused by a positioning error a strong rise occurs up to the level indicated by a dot-and-dash line. The exertion of a lateral displacement force causes the transgression of the level of $F_x$, which is shown by a dot-dash line. The change of the direction of the displacement forces causes a drop of the counter forces below the level indicated by a broken line. From the course of the displacement command c it is apparent that the frequency of the occurence of the displacement command decreases with time, which is indicative of the attainment of a stable state.

Figure 9:
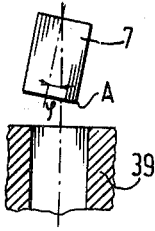
Figure 10:
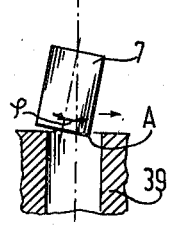

FIGS. 8, 9 and 10 illustrate at consecutive instants the respective approaches of a pin 7 to a hole in a second object 39. The shape of the pin 7 and of the hole is such that no or hardly any self-finding effect is obtained. Therefore, when the pin fits very intimately in the hole, the chance of a correct relative insertion position is practically nil. Therefore, when the hole is approached the device according to the invention can bring the longitudinal direction of the pin at an angle $\phi$ to the desired direction of displacement, i.e. the longitudinal direction of the hole. Thus the severe requirement that the lower surface of the pin 7 should be exactly centered to the end of the hole is eliminated and only the lowest point A of the pin 7 should be located above the hole, a requirement that can be simply satisfied. As soon as owing to the downward displacement and the subsequent lateral displacement of the pin 7 a contact between the second object 39 and the pin 7 is made, a counter-force occurs in one or more degrees of freedom, whereupon the described control of the movements of the pin 7 with respect to the wall of the hole begins.

As stated above, the driving means for each degree of freedom may be formed by an electric motor. The force measuring member may then be designed for measuring the strength of the motor current. In the simplest case the electric motor may be a direct-current motor and the force measuring member may be a resistor connected in series with the motor, the voltage across it being unambiguously connected with the driving force provided by the motor and producing the counter-force, so that the voltage across said resistor can be used as a control-signal.

As an alternative force pick-ups, for example, of the piezo-electric type may be employed.

The invention is of importance for assembling processes but it is not limited thereto. For example, by means of the device according to the invention it can, in general, be ensured that a first object follows a second object with a predetermined, constant force. Examples of use thereof are arc-welding with the use of a distance-determining expedient, automated, mechanical measuring instruments, cementing contact edges, for example, of incandescent lamps, television tubes and the like with the aid of a cement spray nozzle and a distance-determining expedient.

What we claim is:

1. An automatic assembly control apparatus comprising body means for holding an object which is to be moved relatively along one axis into assembled relation to another object; first means for resisting motion of said body means along said one axis to define one degree of freedom of said body means and to provide compliance along said one axis; second means for resisting motion of said body means to define a second degree of freedom thereof and to provide compliance in said second degree of freedom; first force measuring means for providing a first output signal proportional to motion of said body means along said one axis which is due to misalignment of said objects as they are being assembled; second force measuring means for providing a second output signal proportional to deformation of said second means which is due to motion of said body means in said second degree of freedom which is due to misalignment of said objects as they are being assembled; first actuator means for moving said body means along said one axis and second actuator means for effecting movement of said body means in said second degree of freedom thereof; first feedback means responsive to selected values of said first output signal for causing said first actuator means to move said body means selected distances along said one axis in that direction which decreases said first output signal and second feedback means responsive to a selected values of said second output signal for causing said second actuator means to move said body means selected amounts in the path of said second degree of freedom in that direction which decreases said second output signal and each feedback means being effective to selectively vary the compliance of the respective first and second means.

* * * * *